T. T. McALLISTER & W. W. McDONALD.
CULTIVATING-PLOW.

No. 185,039. Patented Dec. 5. 1876.

WITNESSES:
E. Wolff
John Goethals

INVENTOR:
T. T. McAllister
W. W. McDonald
BY
ATTORNEYS.

UNITED STATES PATENT OFFICE.

THOMAS T. McALLISTER AND WILLIAM W. McDONALD, OF NEW ALBANY, MISSISSIPPI.

IMPROVEMENT IN CULTIVATING-PLOWS.

Specification forming part of Letters Patent No. 185,039, dated December 5, 1876; application filed February 5, 1876.

*To all whom it may concern:*

Figure 1:
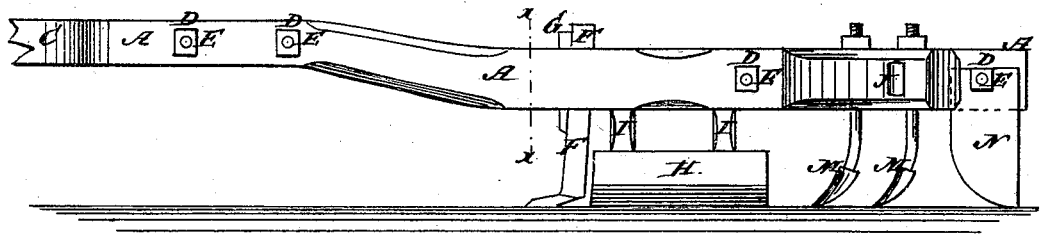
Figure 2:
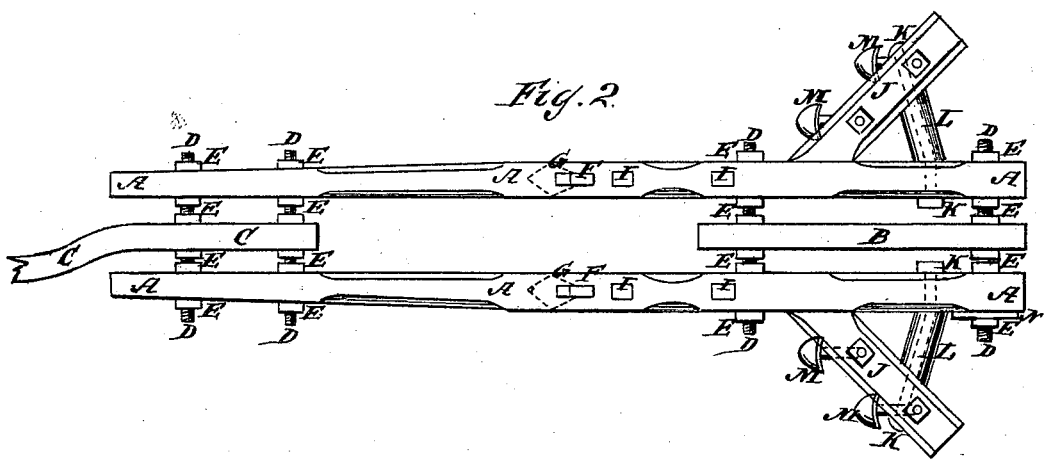
Figure 3:
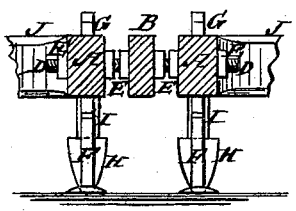

Be it known that we, THOMAS T. MCALLISTER and WILLIAM W. MCDONALD, of New Albany, in the county of Union and State of Mississippi, have invented a new and useful Improvement in Cultivating-Plow, of which the following is a specification:

Figure 1 is a side view of our improved plow. Fig. 2 is a top view of the same. Fig. 3 is a vertical cross-section of the same, taken through the line $x\ x$, Fig. 1.

Similar letters of reference indicate corresponding parts.

This cultivator is designed for use in either the corn or cotton field.

The improvement relates, particularly, to the construction and arrangement of parts for loosening and moving the soil gradually toward the rows of young plants.

In the drawing, A A indicate the beams to which the cultivating devices are variously attached, the same being bent upward at the the front end, and rigidly secured parallel by means of screw-threaded rods D and nuts E applied thereto, as shown. A bar or beam, B, is preferably placed between the rear ends, and the tongue C between the front ends, of the beams. The tongue is also bent to one side, to allow the horse to walk at one side of the row of plants. Shovels M are attached to obliquely-arranged bars J, having braces L. A guide-plate, N, is attached to the rear end of a beam, A, whenever the latter is used singly, for the purpose of resisting side draft and imparting steadiness of motion.

The devices to which our invention more particularly relates are the follow-blocks H, which are arranged directly in rear of the colters or furrow-openers F, and horizontally or parallel to the beams A, to which they are attached by standards I. The said follow-blocks are wedge-shaped or tapered at their front ends, and approximately V-shaped in cross-section, the bottom being gently rounded. The colters or furrow-openers F may be adjusted higher or lower by means of wedges G.

The operation is as follows: The implement is so placed as to straddle the row of corn or cotton plants, and thus cultivate the ground on each side thereof. The blocks H run on the surface of the ground, and serve to push gradually toward the plants a portion of the earth loosened or thrown up by the colters F, which work immediately in advance of them. The weeds and grass are covered by the earth thus thrown upon them, and their destruction thereby effected, while the earth immediately contiguous to the roots of the plants is not disturbed. The blocks H likewise constitute the support of the whole machine while in operation, performing, in this respect, the function of transporting-wheels having a broad tread.

What we claim is—

In a cultivator the combination, with the beams A and colters F, of the follow-blocks H, having the form specified, and arranged horrizontally, as shown and described, to operate as specified.

THOMAS T. McALLISTER.
WILLIAM W. McDONALD.

Witnesses:
J. W. LEWELLEN,
D. F. BRYAN.